(12) United States Patent
Fujiki (10) Patent No.: US 6,861,126 B2
(45) Date of Patent: Mar. 1, 2005

(54) MAGNETIC RECORDING MEDIUM POSSESSING A MAGNETIC LAYER HAVING PLURAL OXYGEN-CONTAINING REGIONS

(75) Inventor: Kuniharu Fujiki, Mito (JP)

(73) Assignee: JVC Victor Company of Japan, Ltd., Kanagawa-ken (JP)

( * ) Notice: Subject to any disclaimer, the term of this patent is extended or adjusted under 35 U.S.C. 154(b) by 0 days.

(21) Appl. No.: 10/360,446

(22) Filed: Feb. 6, 2003

(65) Prior Publication Data

US 2003/0152812 A1 Aug. 14, 2003

(30) Foreign Application Priority Data

Feb. 6, 2002 (JP) .......................................... 2002-029190
Nov. 19, 2002 (JP) .......................................... 2002-334986

(51) Int. Cl.$^7$ ................................................ G11B 5/65
(52) U.S. Cl. ................... 428/212; 428/409; 428/694 T; 428/702
(58) Field of Search ................................ 428/212, 409, 428/694 T, 702

(56) References Cited

U.S. PATENT DOCUMENTS 4,596,735 A * 6/1986 Noguchi et al. ............ 428/215

* cited by examiner

Primary Examiner—Kevin M. Bernatz
(74) Attorney, Agent, or Firm—Anderson Kill & Olick, P.C.; Eugene Lieberstein; Michael N. Meller (57) ABSTRACT

On a polymeric substrate 1, there is formed with a single magnetic layer 2 containing a ferromagnetic metal and oxygen. The magnetic layer 2 is divided into three regions equally in the depth direction from the polymeric substrate 1 to the surface of the magnetic layer 2, wherein the three regions are defined as a first region 21, a second region 22 and a third region 23 respectively in accordance with a process of forming the magnetic layer 2. With defining that a maximum value of oxygen concentration in the first region 21 is "Max 1", a minimum value of oxygen concentration in the second region 22 is "Min 2", and a maximum value of oxygen concentration in the third region 23 is "Max 3" respectively, these values "Max 1", "Min 2" and "Max 3" have relations of "Min 2"<"Max 1" and "Min 2"≦"Max 3"≦"Max 1".

3 Claims, 11 Drawing Sheets

Fig. 7 Comparative Example 1

Fig. 8  Comparative Example 3

Fig. 9 Comparative Example 7

Fig. 10  Comparative Example 9

Fig. 11 Prior Art

MAGNETIC RECORDING MEDIUM POSSESSING A MAGNETIC LAYER HAVING PLURAL OXYGEN-CONTAINING REGIONS

BACKGROUND OF THE INVENTION

1. Field of the Invention

The present invention relates to a magnetic recording medium such as a video tape for analog or digital recording and a data tape, particularly, relates to a magnetic recording medium, which can provide a higher reproduction output and a higher C/N (carrier to noise ratio) in a short wavelength recording range.

2. Description of the Related Art

Recently, it is required for a magnetic recording medium such as a video tape and a data tape to be excellent in recording and reproducing characteristics in a short wavelength recording range along with a recording and reproducing apparatus, which is advanced to higher recording density. In the case of a digital video tape (hereinafter referred to as DVC tape), for example, a so-called evaporation tape, which adopts a ferromagnetic metal thin film, has been put into practical use for the purpose of improving recording density.

Such an evaporation tape formed with a ferromagnetic metal thin film is manufactured by the vacuum evaporation method and has excellent recording and reproducing characteristics in a short wavelength recording range. With respect to a magnetic layer of evaporation tape, such a material as Co (cobalt), Co—Ni, Co—O, and Co—Ni—O has been examined. In the case of an evaporation tape for Hi-8 system video tape recorder (VTR) that is commonly available in the market, the evaporation tape is formed with a Co—Ni—O layer over a polymeric substrate.

Further, in the case of a DVC tape for digital video recording that is commonly available in the market, such a DVC tape is an evaporation tape formed with a Co—O magnetic layer.

Figure 6A:
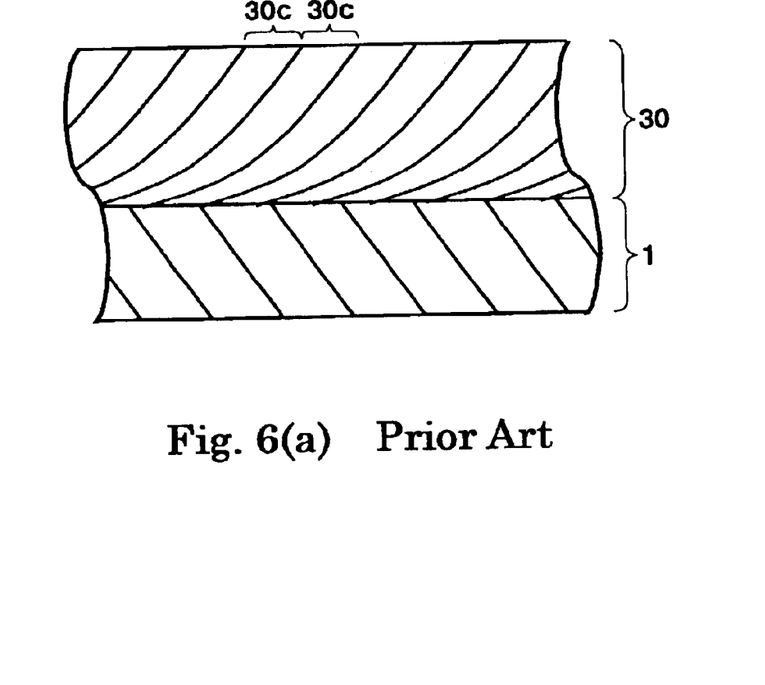
FIGS. 6(a) and 6(b) are enlarged cross sectional views of conventional magnetic recording mediums according to the prior art.
Figure 6B:
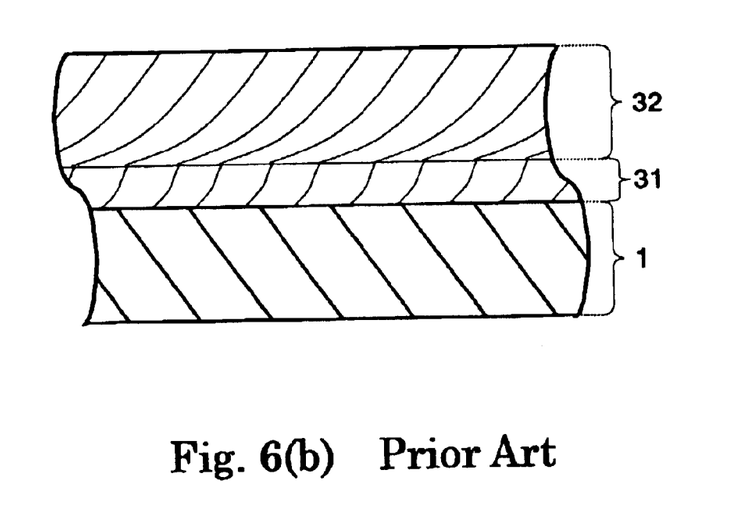

FIGS. 6(a) and 6(b) are an enlarged cross sectional view of a conventional magnetic recording medium according to the prior art. In FIG. 6(a), an evaporation tape is composed of a polymeric substrate 1 and a magnetic layer 30 that is formed over the polymeric substrate 1. As shown in FIG. 6(a), the magnetic layer 30 is formed with a plurality of columns 30c that are composed of crystalline particles. Each column 30c tilts with respect to the normal line of the polymeric substrate 1. A forming method of such a magnetic layer is called an oblique evaporation method.

With referring to FIG. 11, a manufacturing method of conventional magnetic recording medium is explained next.

Figure 11:
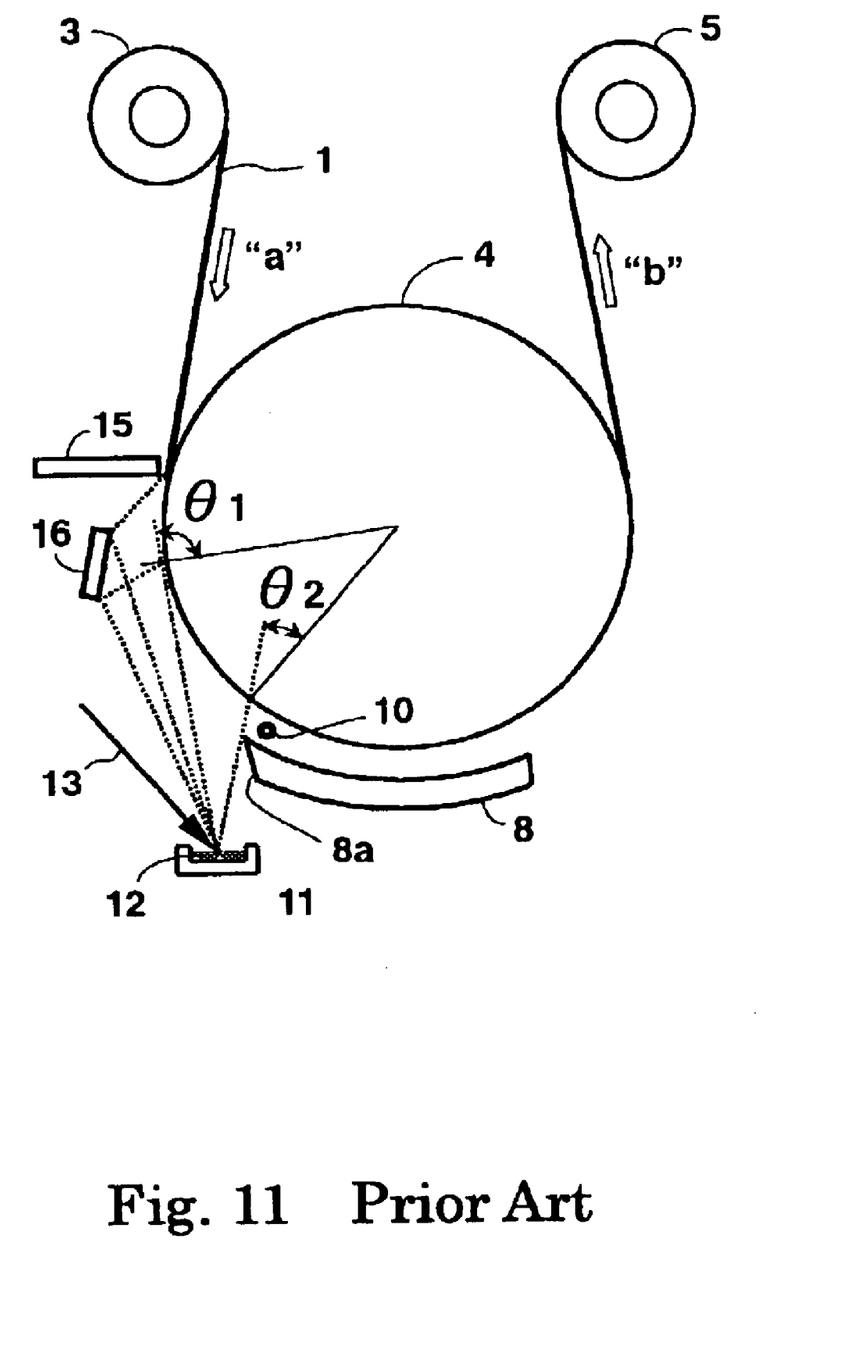
FIG. 11 is a plan view of a general manufacturing apparatus for manufacturing an evaporation tape by using the oblique evaporation method according to the prior art.

FIG. 11 is a plan view of a general manufacturing apparatus for manufacturing an evaporation tape by using the oblique evaporation method according to the prior art. In FIG. 11, the polymeric substrate 1 is pulled out from a supply roll 3 to an arrow "a" direction, and runs along the outer circumference of a cylindrical cooling can roll 4, and finally taken up by a take-up roll 5 with being toward an arrow "b" direction. An evaporation material 12 such as Co, which becomes crystalline particles and forms a magnetic layer, is filled in a crucible 11 and evaporates by being heated by irradiating an electron beam 13.

An atom evaporated from the evaporation material 12 (hereinafter referred to as evaporated atom) is reflected by a thin plate 16 or a reflector 16, which is disposed on a position that faces toward the polymeric substrate 1 approximately and heated more than the melting point of Co, and deposited on the surface of the polymeric substrate 1 that is running along the cylindrical cooling can roll 4. The magnetic layer having oblique magnetic anisotropy, which is formed by the evaporated atom reflected by the reflector 16, is formed on the surface of the polymeric substrate 1, and then continuously formed by evaporated atoms that fly directly from the crucible 11 and deposit on the surface of the polymeric substrate 1.

As mentioned above, the evaporated atom of the evaporation material 11 is deposited on the surface of the polymeric substrate 1 within an opening section between the reflector 16 and an anti-deposition plate 8. An ending point of deposition is almost an edge portion 8a of the anti-deposition plate 8 in the opening section side. By injecting oxygen gas through an oxygen gas injection spout 10 that is installed adjacent to the edge portion 8a, an oxide layer of the evaporation material 12 can be formed on the polymeric substrate 1.

With respect to a method of improving recording and reproducing characteristics of an evaporation tape, several methods such as providing discontinuous multi-layers of evaporation layer or controlling oxygen gas density in a magnetic layer have been introduced.

For example, the Japanese Patent Laid-open Publication No. 8-315346/1996 discloses a multi-layered evaporation tape shown in FIG. 6(b). As shown in FIG. 6(b), the multi-layered evaporation tape is composed of a first magnetic layer 31 and a second magnetic layer 32, wherein they are formed through an evaporation process twice and discontinuous with respect to each other.

The Japanese Patent Laid-open Publication No. 10-324965/1998 discloses an evaporation tape as a recording medium having a magnetic layer in which crystalline particles are disposed continuously. In the evaporation tape, columns that constitute the magnetic layer are oriented partially in a circular arc in the polymeric substrate side, and then oriented in columnar.

The Japanese Patent Laid-open Publication No. 2001-143235 discloses a magnetic recording medium that is composed of a magnetic layer having a columnar crystalline structure. Each column is divided into three sections. In each section, oxygen density, magnetic flux density or a tilt angle of each column is specified.

By the magnetic recording medium according to the prior arts mentioned above, there existed problems such that the magnetic recording medium does not have high coercive force, or hardly provides a high reproduction output or a high C/N in a short wavelength recording range.

Further, in the case of the multi-layered evaporation tape that is disclosed in the Japanese Patent Laid-open Publication No. 8-315346/1996, there existed a problem such that productivity is deteriorated because 2-time evaporation process is essential.

SUMMARY OF THE INVENTION

Accordingly, in consideration of the above-mentioned problems of the prior arts, an object of the present invention is to provide a magnetic recording medium, which is composed of a single magnetic layer and has a high coercive force and can exhibit a higher reproduction output and a higher C/N (carrier to noise ratio) in a short wavelength recording range.

According to an aspect of the present invention, there provided a magnetic recording medium comprising: a substrate; and a single magnetic layer containing a ferromagnetic metal and oxygen formed on the substrate, the magnetic recording medium is further characterized in that the magnetic layer is divided into three regions, which are a first region, a second region and a third region respectively, equally in a depth direction from the substrate side to the surface of the magnetic layer, and with defining such that a maximum value of oxygen concentration in the first region is "Max 1", a minimum value of oxygen concentration in the second region is "Min 2", and a maximum value in the third region is "Max 3", the values "Max 1", "Min 2" and "Max 3" satisfy following equations: "Min 2"<"Max 1" and "Min 2"≦"Max 3"≦"Max 1".

Other object and further features of the present invention will be apparent from the following detailed description when read in conjunction with the accompanying drawings.

DETAILED DESCRIPTION OF THE PREFERRED EMBODIMENTS

[Embodiment]

Figure 1A:
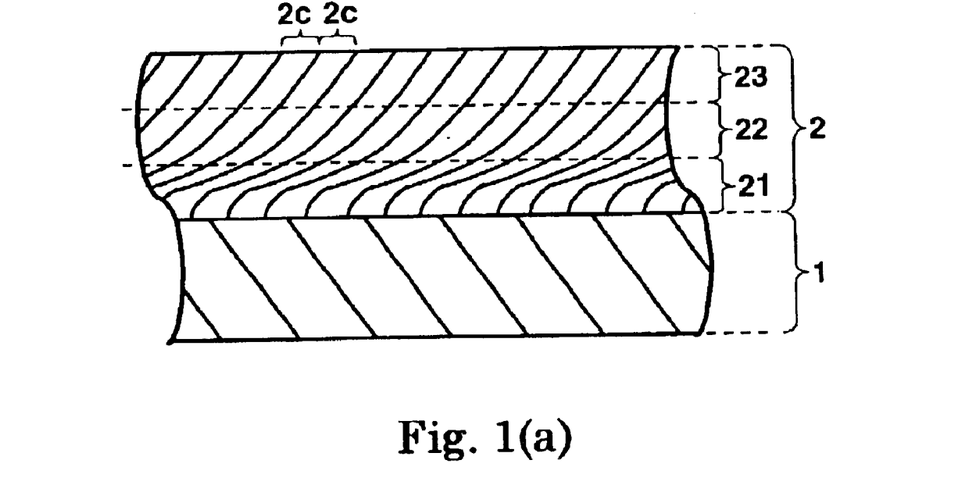
FIGS. 1(a) and 1(b) are enlarged cross sectional views of a magnetic recording medium according to the present invention.
Figure 1B:
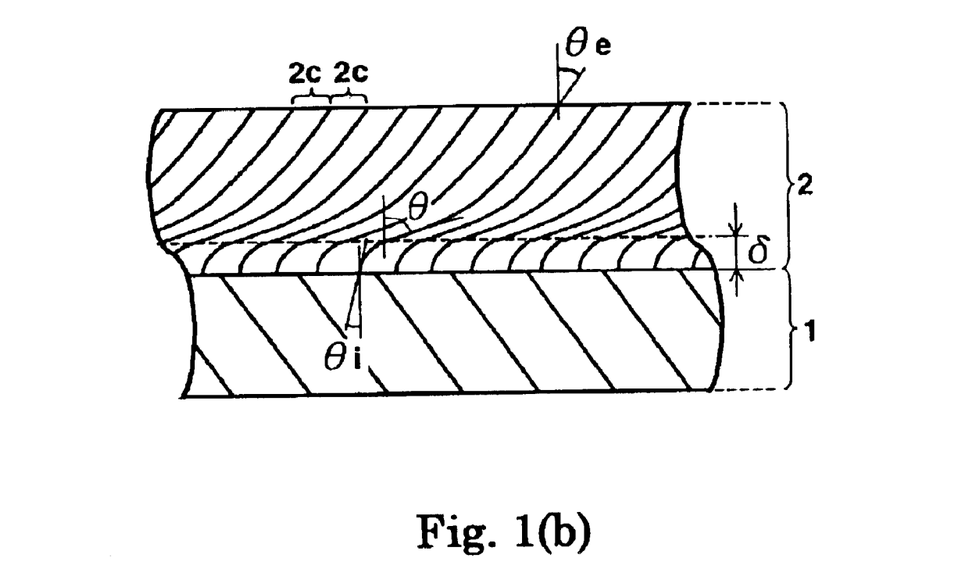

FIGS. 1(a) and 1(b) are enlarged cross sectional views of a magnetic recording medium according to the present invention.

Figure 2:
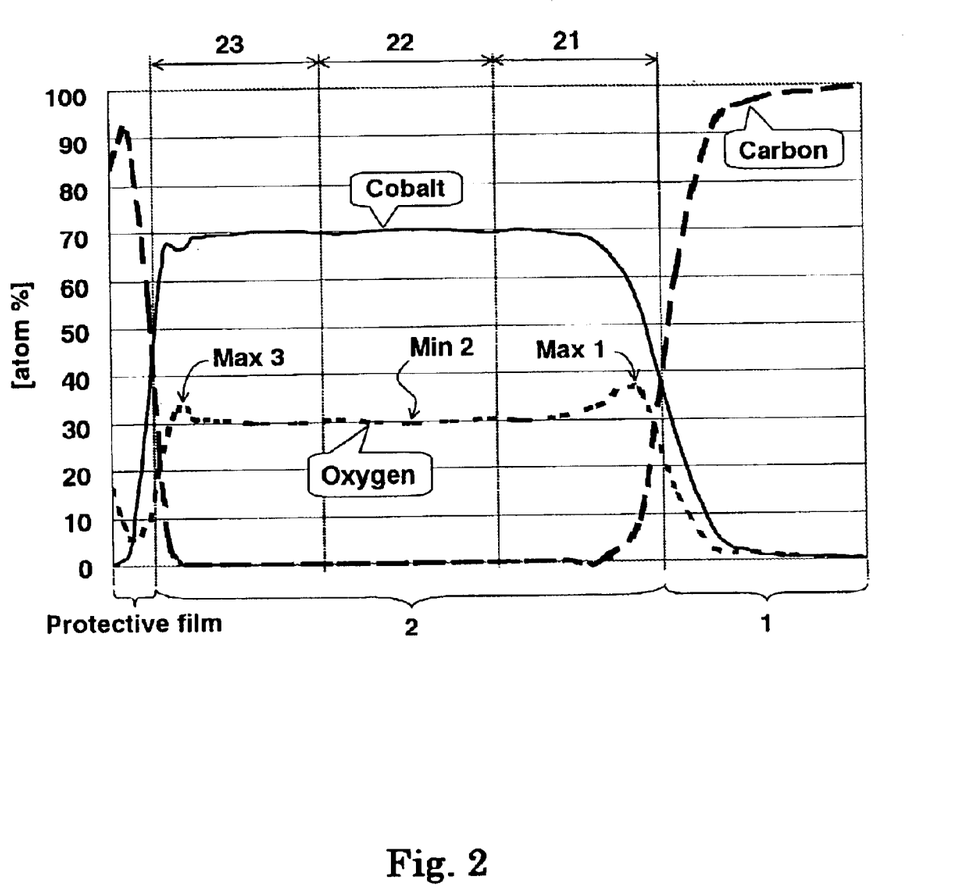
FIG. 2 is a graph of characteristics showing a result of analyzing elements in a magnetic recording medium according to an embodiment 1 of the present invention.

FIG. 2 is a graph of characteristics showing a result of analyzing elements in a magnetic recording medium according to an embodiment 1 of the present invention.

Figure 3:
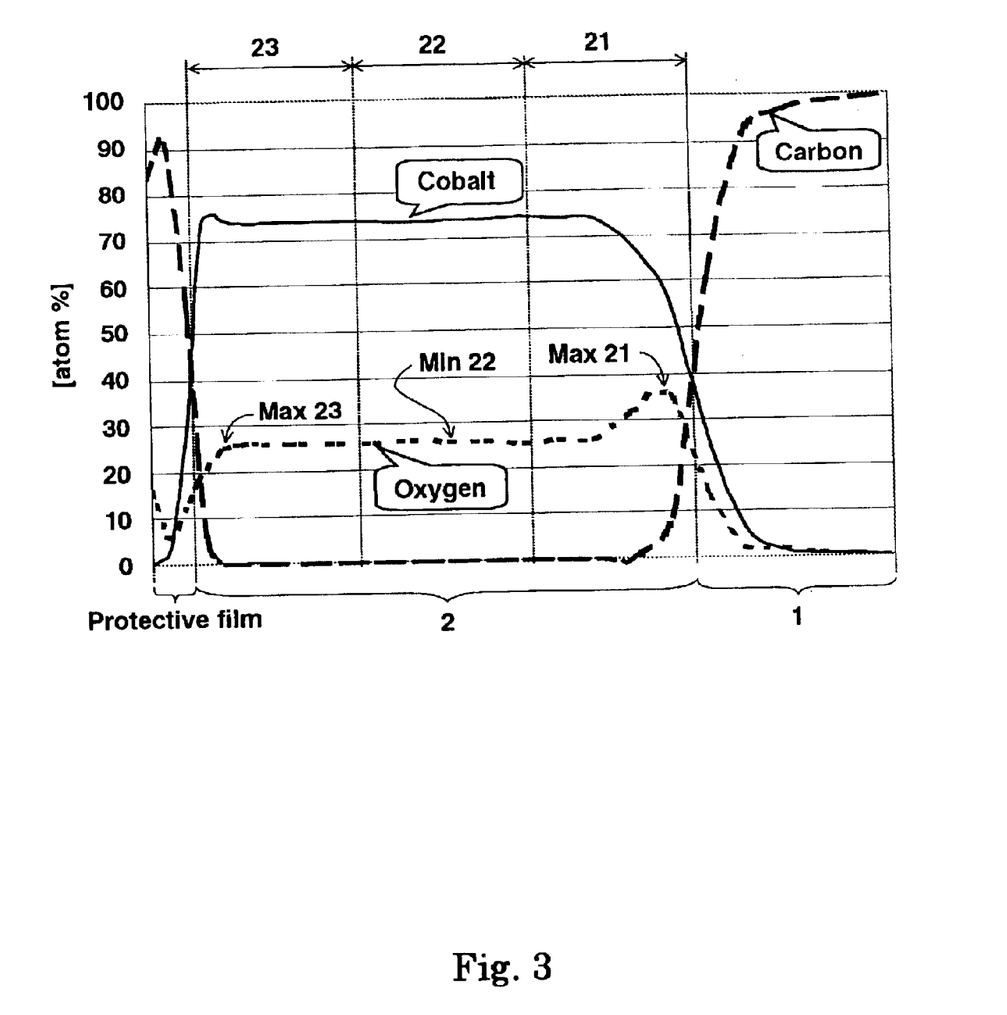
FIG. 3 is another graph of characteristics showing a result of analyzing elements in a magnetic recording medium according to an embodiment 2 of the present invention.

FIG. 3 is another graph of characteristics showing a result of analyzing elements in a magnetic recording medium according to an embodiment 2 of the present invention.

Figure 4:
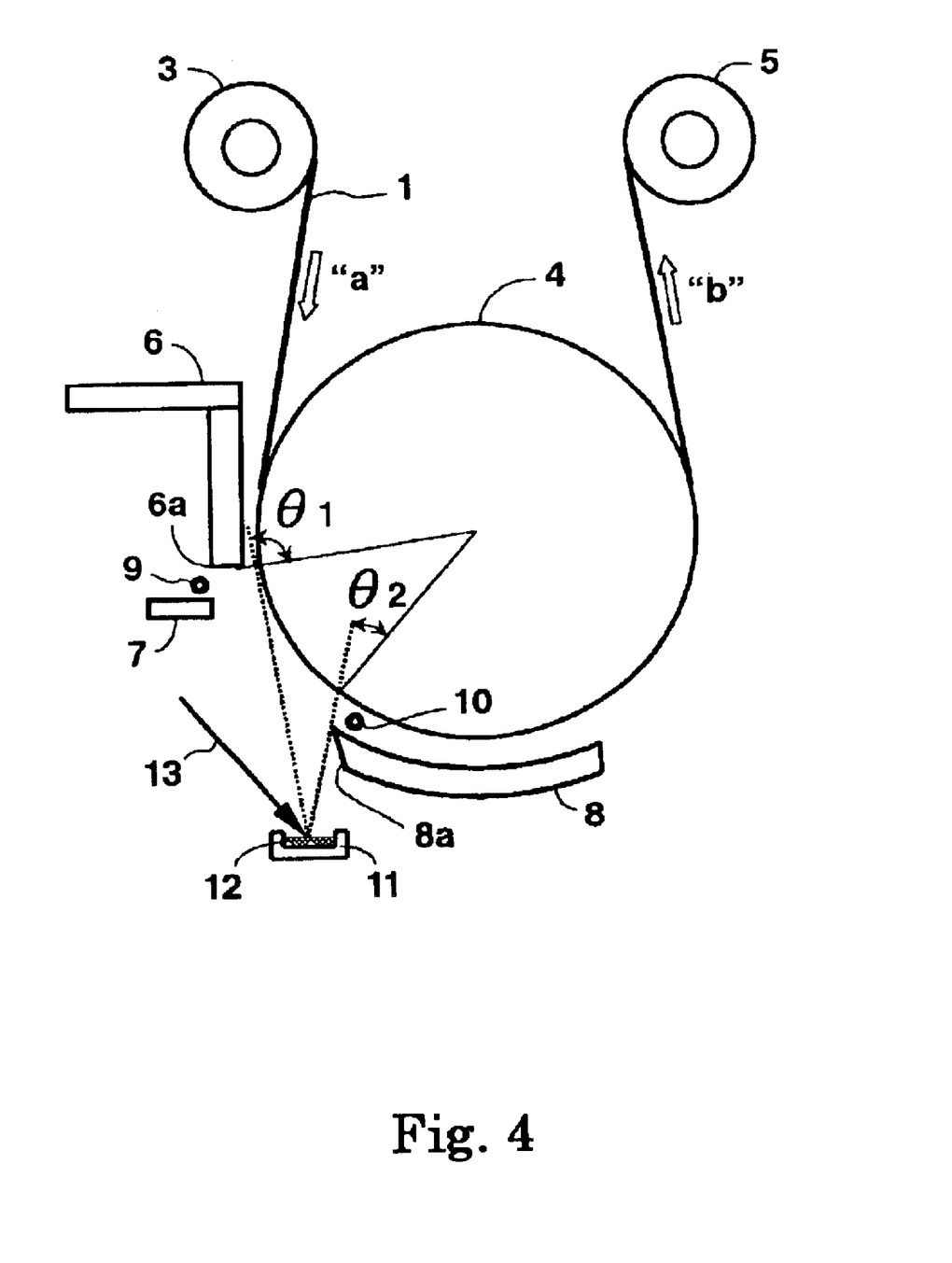
FIG. 4 is a structural drawing of a manufacturing apparatus for manufacturing a magnetic recording medium according to the present invention.

FIG. 4 is a structural drawing of a manufacturing apparatus for manufacturing a magnetic recording medium according to the present invention.

Figure 5:
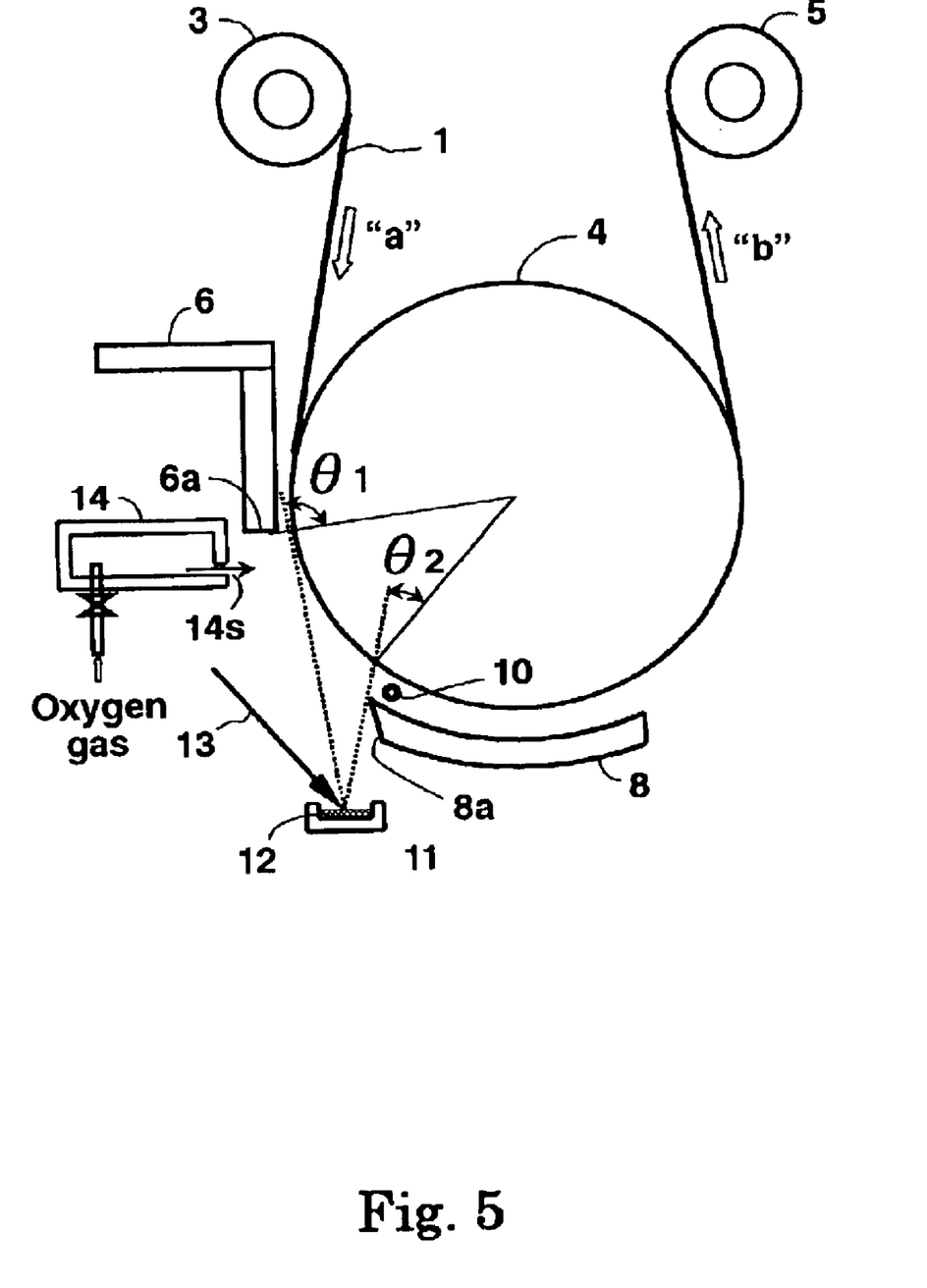
FIG. 5 is another structural drawing of a manufacturing apparatus for manufacturing a magnetic recording medium according to the present invention.

FIG. 5 is another structural drawing of a manufacturing apparatus for manufacturing a magnetic recording medium according to the present invention.

In FIG. 1(a), a magnetic recording medium is composed of a nonmagnetic polymeric substrate 1 or a plastic substrate 1 (hereinafter referred to as substrate 1) and a magnetic layer 2, which is formed on the substrate 1 with a ferromagnetic thin film made from a ferromagnetic metal material through a vacuum evaporation process. The magnetic layer 2 is formed by the vacuum evaporation process once as detailed in a later paragraph. With respect to a material of the substrate 1, such a material as polyethylene terephthalate (PET), polyethylene naphthalate (PEN) or aramid film is used. In this embodiment, a ferromagnetic metal used for the magnetic layer 2 that is formed by the vacuum evaporation process contains non-oxidized cobalt Co and cobalt oxide CoO. In FIGS. 1(a) and 1(b), a thickness of the magnetic layer 2 is illustrated as thicker than that of the substrate 1. However, it should be understood that the film thickness of the magnetic layer 2 is thinner than the thickness of the substrate 1 actually.

The magnetic layer 2 has a columnar crystalline structure that is composed of a plurality of columns 2c. A column stands for a basic unit that constitutes the columnar crystalline structure. In this embodiment, the column is a crystal such that one Co crystal particle is surrounded with a plurality of CoO crystal particles and results in constituting another crystal, and grows.

In this embodiment, as shown in FIG. 1(a), the magnetic layer 2 is divided into 3 regions with dividing the magnetic layer 2 equally in the thickness direction. With defining that the three regions are regions 21, 22 and 23 from the substrate 1 side to a surface side of the magnetic layer 2 respectively, as mentioned in a later paragraph, it is studied that an oxygen concentration in each of the regions 21, 22 and 23 should be set suitably, wherein these regions 21, 22 and 23 are defined as an initial (first) region 21, an middle (second) region 22 and a latter (third) region 23 in accordance with a process of forming the magnetic layer 2.

Further, as shown in FIG. 1(b), it is also studied that a first tilt angle $\theta i$ with respect to a normal line of the substrate 1 at a point where a column 2c, which is composed of a crystalline particle and contacts with the substrate 1, starts to grow, and a third tilt angle $\theta e$ with respect to the normal line of the substrate 1 on the surface of the magnetic layer 2 where the column 2c stops growing should be set appropriately.

According to an experiment by an inventor of the present invention, it is found that a magnetic recording medium can exhibit excellently a higher reproduction output in a short wavelength recording range if the magnetic layer 2 is formed with satisfying following parameters. The parameters are such that a first tilt angle $\theta i$ is within an angle range from zero degree to 30 degrees, a thickness $\delta$, which is a thickness of the column 2c that grows continuously from the surface of the substrate 1 until a second tilt angle $\theta$ with respect to the normal line of the substrate 1 exceeds 30 degrees, is within a range from 3 nm to 14 nm, and the third tilt angle $\theta e$ is within an angle range from 20 degrees to 50 degrees.

A crystal particle of the column 2c that grows continuously becomes large in size when the first tilt angle $\theta i$ exceeds 30 degrees. A density of column 2c results in rough. Consequently, an output can be hardly obtained, noise increases at the same time, and a C/N (carrier to noise ratio) is deteriorated.

With respect to the thickness $\delta$ until the second tilt angle $\theta$ of a growing column 2c exceeds 30 degrees, in a case that the thickness δ is less than 3 nm, a component of growing a crystal particle that grows directly on the surface of the substrate 1 to an inclined direction increases. Consequently, the above-mentioned higher reproduction output in a short wavelength recording range can not be obtained. On the contrary, in a case that the thickness δ exceeds 14 nm, a component of magnetic anisotropy in the vertical direction increases extremely. Therefore, a magnetic recording medium in conformity to a longitudinal recording method such as the magnetic recording medium according to this embodiment is not effectively magnetized while recording lower frequencies, that is, in a long wavelength recording range. Consequently, an output in a lower frequency range decreases and a C/N is deteriorated.

Further, in a case that the third tilt angle θe is less than 20 degrees, a coercive force decreases and an outermost layer of the magnetic layer 2 that is a short wavelength recording range is not magnetized effectively. Consequently, a reproduction output decreases. On the contrary, in a case that the third tilt angle θe exceeds 50 degrees, an evaporation efficiency is deteriorated extremely and resulted in deteriorating productivity. In order to improve evaporation efficiency, that is, in order to improve productivity, increasing evaporation amount by raising an electron beam power is resulted in increasing a size of crystal particle. Consequently, a C/N is deteriorated.

Although not shown in FIGS. 1(a) and 1(b), it is preferable for a magnetic recording medium according to the present invention that a diamond-like carbon film is formed on the magnetic layer 2 as a protective layer by using mixture gas of ethylene and argon through a plasma CVD (chemical vapor deposition) method, and further a lubricant layer containing fluorine compound is formed over the protective layer.

Furthermore, it is also preferable for the magnetic recording medium according to the present invention that a back coat layer is provided on a back side of the substrate 1, opposite to the magnetic layer 2, for a purpose of improving running ability of the magnetic recording medium with respect to a guide pole or like in a driving system of VTR.

In a magnetic recording medium formed with a single magnetic layer 2 containing a ferromagnetic metal and oxygen on a substrate 1 according to the present invention, the magnetic layer 2 is divided into 3 regions equally in the thickness direction, wherein the three regions are referred to as first, second and third regions from the substrate 1 side to a surface side of the magnetic layer 2 respectively. In a case that a maximum value "Max 1" of oxygen concentration in the first region, a minimum value "Min 2" of oxygen concentration in the second region, and a maximum value "Max 3" of oxygen concentration in the third region is in the relations of "Min 2"<"Max 1" and "Min 2"≦"Max 3"≦"Max 1", the magnetic recording medium according to the present invention exhibits a higher coercive force, a higher reproduction output in a short wavelength recording range and a higher C/N than those of a conventional magnetic recording medium.

With referring to FIGS. 4 and 5, a manufacturing method of a magnetic recording medium according to the present invention is explained.

The magnetic layer 2, which constitutes a magnetic recording medium according to the embodiment of the present invention, is formed on the substrate 1 by the evaporation process once through an electron beam evaporation method in a vacuum evaporation chamber (not shown) while injecting oxygen gas.

In FIG. 4, a manufacturing apparatus of magnetic recording medium is composed of a supply roll 3, a cylindrical cooling can roll 4, a take-up roll 5, three anti-deposition plates 6, 7 and 8, two oxygen gas injection spouts 9 and 10, and a crucible 11, wherein they are installed in a vacuum evaporation chamber (not shown). As shown in FIG. 4, a polymeric substrate (hereinafter referred to as substrate) 1 that is wound around the supply roll 3 is pulled out to an arrow "a" direction and runs along the outer circumference of the cylindrical cooling can roll 4, and finally taken up by the take-up roll 5 with being toward an arrow "b" direction. An evaporating material 12 such as Co (cobalt), which becomes crystal particles and forms a magnetic layer on the substrate 1, is filled in the crucible 11 and evaporates by being heated by irradiation of an electron beam 13. Evaporation of the evaporating material 12 is deposited on the substrate 1, which runs along the cylindrical cooling can roll 4, within an opening section between the anti-deposition plates 6 and 8. A column 2c shown in FIGS. 1(a) and 1(b), which constitutes the magnetic layer 2, grows continuously. In other words, regions 21, 22 and 23 are formed continuously.

Further, by injecting oxygen gas from the oxygen gas injection spouts 9 and 10, which are provided adjacent to edge portions 6a and 8a of the anti-deposition plates 6 and 8, during this process, a layer of oxide compound of the evaporating material 12 can be formed on the substrate 1.

Each oxygen concentration of first, second and third regions 21, 22 and 23 of the magnetic layer 2 can be controlled by an oxygen gas injection amount from the oxygen gas injection spouts 9 and 10, a construction of oxygen gas injection device (not shown), or evaporation rate of Co.

Further, in FIG. 4, θ1 and θ2 represents an incident angle of the evaporating material 12 into the substrate 1, wherein the incident angle is an angle between an incident direction of the evaporating material 12 into the substrate 1 and the normal line of the substrate 1. The first tilt angle θi with respect to a normal line of the substrate 1 at a point where a column 2c starts to grow, and a third tilt angle θe with respect to the normal line of the substrate 1 on the surface of the magnetic layer 2 where the column 2c stops growing can be controlled by the incident angles θ1 and θ2, an oxygen gas injection amount from the oxygen gas injection spouts 9 and 10, a structure of oxygen gas injection device (not shown), or Co gas concentration in a neighboring area of the edge portions 6a and 8a.

FIG. 5 shows another manufacturing apparatus of magnetic recording medium having an oxygen gas storage box 14 according to the present invention. The other manufacturing apparatus shown in FIG. 5 is identical to the manufacturing apparatus shown in FIG. 4 except for the oxygen gas storage box 14. Therefore, detailed descriptions of the same components and functions are omitted.

Oxygen gas is supplied to the oxygen gas storage box 14 through a pipe that is controlled by a mass flowmeter. A slit 14s having a uniform width of 2 nm to 10 nm, which is disposed in parallel to the width direction of the substrate 1, is provided as an exit for oxygen gas. Oxygen gas exited through the slit 14s disturbs evaporated cobalt flow that flies from the crucible 11 to a portion on the substrate 1 at where a crystal particle starts to grow. Accordingly, the first tilt angle θi with respect to the normal line of the substrate 1 can be set to less than 30 degrees.

(Embodiment 1)

By using the manufacturing apparatus shown in FIG. 4, a ferromagnetic metal thin film is formed on a polymeric substrate in a vacuum. In this embodiment 1, a PET (polyethylene terephthalate) film having granular projections and earthworm-like projections together, which is 6.4 μm thick, is used for a polymeric substrate (hereinafter referred to as substrate) 1, and pure cobalt (Co) is used for a ferromagnetic metal. The substrate 1 that is wound around the supply roll 3 runs along the cylindrical cooling can roll 4 to the arrow "a" direction by a speed of 150 m/min. The pure Co is filled in the crucible 11 as an evaporating material 12 and evaporated by the electron beam 13 so as to be deposited on the substrate 1 while injecting oxygen gas through the oxygen gas injection spouts 9 and 10. In this vacuum deposition process, the incident angles θ1 and θ2 is set to 90 degrees and 40 degrees respectively, and 50 sccm (standard $cm^3$/min) of oxygen gas and 2200 sccm of oxygen gas is injected through the oxygen gas injection spouts 9 and 10 respectively. Consequently, an evaporation tape composed of a ferromagnetic metal thin film (magnetic layer 2) having a film thickness of 0.18 μm approximately is manufactured. The thickness of the magnetic layer 2 is adjusted by controlling an output of the electron beam 13. Then a protective film, a lubricant layer and a back coat layer is formed thereon. Finally, the evaporation tape is cut in ¼ inch wide by using a regular splitter. Accordingly, a magnetic recording medium according to the present invention is manufactured.

FIG. 2 is a graph showing a result of analyzing elements contained in a magnetic recording medium according to the embodiment 1 of the present invention obtained by a sputter etching method in the depth direction from the surface of the magnetic recording medium including a protective film by using an X-ray photo-electron spectroscopic analyzer (ESCA). Oxygen concentration of the regions 21, 22 and 23 is explained hereupon.

In FIG. 2, the graph exhibits a result of analyzing respective part of a magnetic recording medium such that the far left part of the graph is a diamond-like carbon layer provided on the surface of the magnetic layer 2 of the magnetic recording medium as a protective film, the middle part of the graph is the magnetic layer 2, and the far right part of the graph is the substrate 1 respectively. The regions 21, 22 and 23 shown in FIG. 1 correspond to ranges 21, 22 and 23 shown in FIG. 2. With defining a maximum value of oxygen concentration in the region 21 as "Max 1", a minimum value of oxygen concentration in the region 22 as "Min 2", and a maximum value of oxygen concentration in the region 23 as "Max 3", the values of "Max 1", "Min 2" and "Max 3" are compared with each other. In this case, oxygen concentration is an oxygen amount with respect to a metal atom in the magnetic layer 2. In other words, the oxygen concentration represents a ratio (atom %) of oxygen atom to a total of Co and CoO.

The magnetic recording medium shown in FIG. 2 is in conformity to the embodiment 1 of the present invention, wherein "Max 1" is the largest value, "Min 2" is the smallest value, and "Max 3" is intermediate value between "Max 1" and "Min 2", that is, "Min 2"<"Max 3"<"Max 1".

"Max 1" and "Max 3" in FIG. 2 exhibits a peak locally. These peaks can be obtained by injecting excessive oxygen when evaporating the magnetic layer 2. However, these peak portions, which are supplied with excessive oxygen, are weak in magnetism.

(Embodiment 2)

A magnetic recording medium according to an embodiment 2 of the present invention is manufactured identically to the magnetic recording medium of the embodiment 1 except for settings of incident angles θ1 and θ2 and an injection amount of oxygen gas through the oxygen gas injection spout 10. In the embodiment 2, the incident angles θ1 and θ2 is set to 80 degrees and 55 degrees respectively. 1800 sccm of oxygen gas is injected through the oxygen gas injection spout 10.

FIG. 3 is a graph showing a result of analyzing elements contained in the magnetic recording medium according to the embodiment 2 of the present invention obtained by a sputter etching method in the depth direction from the surface of the magnetic recording medium including a protective film by using an X-ray photo-electron spectroscopic analyzer (ESCA). Oxygen concentration of the regions 21, 22 and 23 is explained hereupon.

In FIG. 3, the graph exhibits a result of analyzing respective part of a magnetic recording medium such that the far left part of the graph is a diamond-like carbon layer provided on the surface of the magnetic layer 2 of the magnetic recording medium as a protective film, the middle part of the graph is the magnetic layer 2, and the far right part of the graph is the substrate 1 respectively. The regions 21, 22 and 23 shown in FIG. 1 correspond to ranges 21, 22 and 23 shown in FIG. 3. With defining a maximum value of oxygen concentration in the region 21 as "Max 21", a minimum value of oxygen concentration in the region 22 as "Min 22", and a maximum value of oxygen concentration in the region 23 as "Max 23", the values of "Max 21", "Min 22" and "Max 23" are compared with each other. In this case, oxygen concentration is an oxygen amount with respect to a metal atom in the magnetic layer 2. In other words, the oxygen concentration represents a ratio (atom %) of oxygen atom to a total of Co and CoO.

The magnetic recording medium shown in FIG. 3 is in conformity to the embodiment 2 of the present invention, wherein "Max 21" is the largest value and "Max 23" is approximately equal to "Min 22", that is, "Min 22"="Max 23"<"Max 21". In addition, it is also acceptable that "Max 23" is equal to "Max 21", that is, "Min 22"<"Max 23"= "Max 21".

"Max 21" in FIG. 3 exhibits a peak locally. The peak can be obtained by injecting excessive oxygen when evaporating the magnetic layer 2. However, the peak portion, which is supplied with excessive oxygen, is weak in magnetism.

(Embodiment 3)

A magnetic recording medium according to an embodiment 3 of the present invention is manufactured identically to the magnetic recording medium of the embodiment 1 except for settings of incident angles θ1 and θ2. In the embodiment 3, the incident angles θ1 and θ2 is set to 80 degrees and 55 degrees respectively.

(Embodiment 4)

A magnetic recording medium according to an embodiment 4 of the present invention is manufactured identically to the magnetic recording medium of the embodiment 1 except for settings of incident angle θ2 and an injection amount of oxygen gas through the oxygen gas injection spout 9. In the embodiment 4, the incident angle θ2 is set to 30 degrees. 80 sccm of oxygen gas is injected through the oxygen gas injection spout 9.

(Embodiment 5)

A magnetic recording medium according to an embodiment 5 of the present invention is manufactured identically to the magnetic recording medium of the embodiment 1 except for an injection amount of oxygen gas through the oxygen gas injection spouts 9 and 10. In the embodiment 5, 30 sccm of oxygen gas is injected through the oxygen gas injection spout 9 and 2500 sccm of oxygen gas is injected through the oxygen gas injection spout 10.

(Embodiment 6)

A magnetic recording medium according to an embodiment 6 of the present invention is manufactured identically to the magnetic recording medium of the embodiment 1 except for an injection amount of oxygen gas through the oxygen gas injection spout 10. In the embodiment 6, 2000 sccm of oxygen gas is injected through the oxygen gas injection spout 10.

(Embodiment 7)

A magnetic recording medium according to an embodiment 7 of the present invention is manufactured identically to the magnetic recording medium of the embodiment 1 except for settings of incident angle θ2 and an injection amount of oxygen gas through the oxygen gas injection spouts 9 and 10. In the embodiment 7, the incident angle θ2 is set to 35 degrees. Oxygen gas is not injected through the oxygen gas injection spout 9. However, 2000 sccm of oxygen gas is injected through the oxygen gas injection spout 10.

(Embodiment 8)

By using the manufacturing apparatus shown in FIG. 5, a ferromagnetic metal thin film is formed on a polymeric substrate in a vacuum. In this embodiment, a PET (polyethylene terephthalate) film having granular projections and earthworm-like projections, which is 6.4 μm thick, is used for a polymeric substrate (hereinafter referred to as substrate) 1, and pure Co is used for a ferromagnetic metal. The substrate 1 that is wound around the supply roll 3 runs along the cylindrical cooling can roll 4 to the arrow "a" direction by a speed of 150 m/min. The pure Co is filled in the crucible 11 as an evaporating material 12 and evaporated by the electron beam 13 so as to be deposited on the substrate 1 while injecting oxygen gas through the oxygen gas injection spouts 9 and 10. In this vacuum deposition process, the incident angles θ1 and θ2 is set to 90 degrees and 35 degrees respectively, and 2200 sccm of oxygen gas is injected through the oxygen gas injection spout 10 and 50 sccm of oxygen gas is supplied to the oxygen gas storage box 14. Consequently, an evaporation tape composed of a ferromagnetic metal thin film (magnetic layer 2) having a film thickness of 0.18 μm approximately is manufactured. Then a protective film, a lubricant layer and a back coat layer is formed thereon. Finally, the evaporation tape is cut in ¼ inch wide by using a regular splitter. Accordingly, a magnetic recording medium according to the embodiment 8 of the present invention is manufactured.

(Embodiment 9)

A magnetic recording medium according to an embodiment 9 of the present invention is manufactured identically to the magnetic recording medium of the embodiment 8 except for a supplying amount of oxygen gas to the oxygen gas storage box 14. In the embodiment 9, 80 sccm of oxygen gas is supplied to the oxygen gas storage box 14.

COMPARATIVE EXAMPLE 1

A magnetic recording medium according to a comparative example 1 is manufactured identically to the magnetic recording medium of the embodiment 1 except for settings of incident angle θ1 and an injection amount of oxygen gas through the oxygen gas injection spouts 9 and 10. In the comparative example 1, the incident angle θ1 is set to 60 degrees, and 2100 sccm of oxygen gas is injected through the oxygen gas injection spout 10, on the contrary, oxygen gas to be injected through the oxygen gas injection spout 9 is interrupted.

Figure 7:
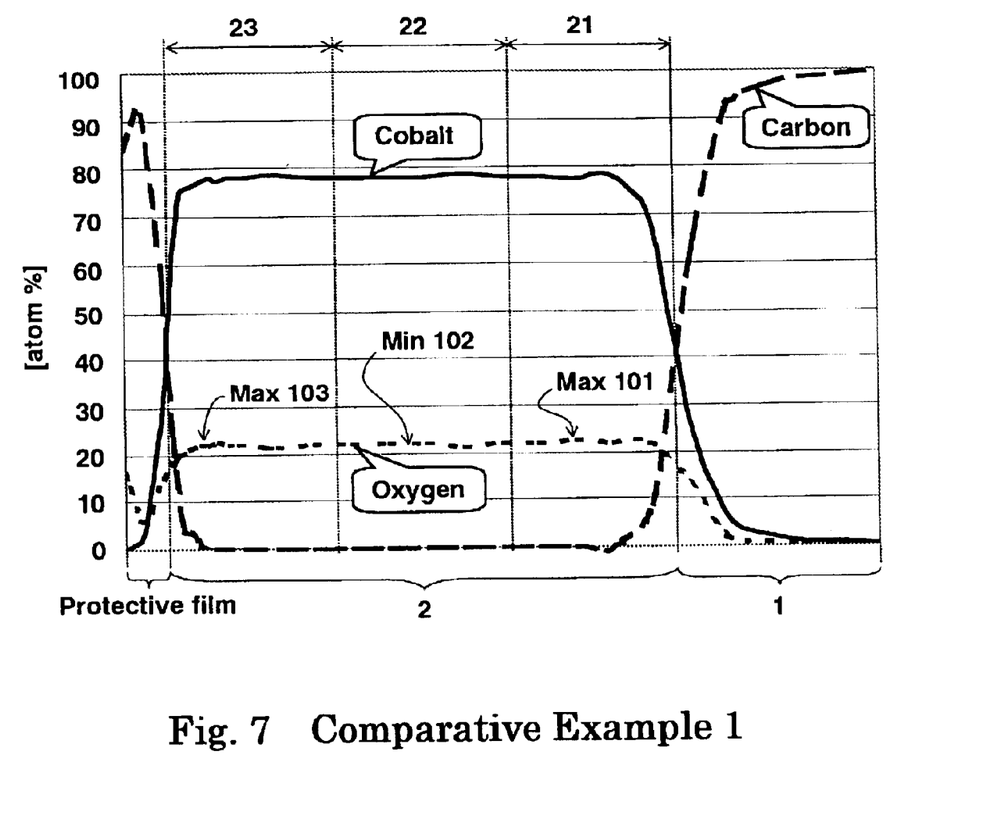
FIG. 7 is a graph of characteristics showing a result of analyzing elements in a magnetic recording medium according to the prior art (comparative example 1).

FIG. 7 is a graph of characteristics showing a result of analyzing elements in the magnetic recording medium according to the comparative example 1. Regions corresponding to the regions 21, 22 and 23 in FIG. 1 are also shown in FIG. 7 for easier understanding.

In FIG. 7, it is defined that a maximum value of oxygen concentration in the region 21 is "Max 101", a minimum value of oxygen concentration in the region 22 is "Min 102", and a maximum value of oxygen concentration in the region 23 is "Max 103". The values of "Max 101", "Min 102" and "Max 103" are compared with each other.

The magnetic recording medium shown in FIG. 7 has such a characteristic that oxygen concentration in any region is equivalent to each other, that is, "Max 101"="Min 102"= "Max 103".

Further, the magnetic recording mediums shown in FIG. 7 according to the comparative example 1 can not exhibit a high coercive force, a high reproduction output or a high C/N at all in a short wavelength recording range.

COMPARATIVE EXAMPLE 2

A magnetic recording medium according to a comparative example 2 is manufactured identically to the magnetic recording medium of the embodiment 1 except for an injection amount of oxygen gas through the oxygen gas injection spout 10. In the comparative example 2, 3000 sccm of oxygen gas is injected through the oxygen gas injection spout 10.

COMPARATIVE EXAMPLE 3

A magnetic recording medium according to a comparative example 3 is manufactured identically to the magnetic recording medium of the embodiment 1 except for settings of incident angles θ1 and θ2 and an injection amount of oxygen gas through the oxygen gas injection spout 10. In the comparative example 3, the incident angles θ1 and θ2 is set to 80 degrees and 55 degrees respectively, and 2000 sccm of oxygen gas is injected through the oxygen gas injection spout 10.

Figure 8:
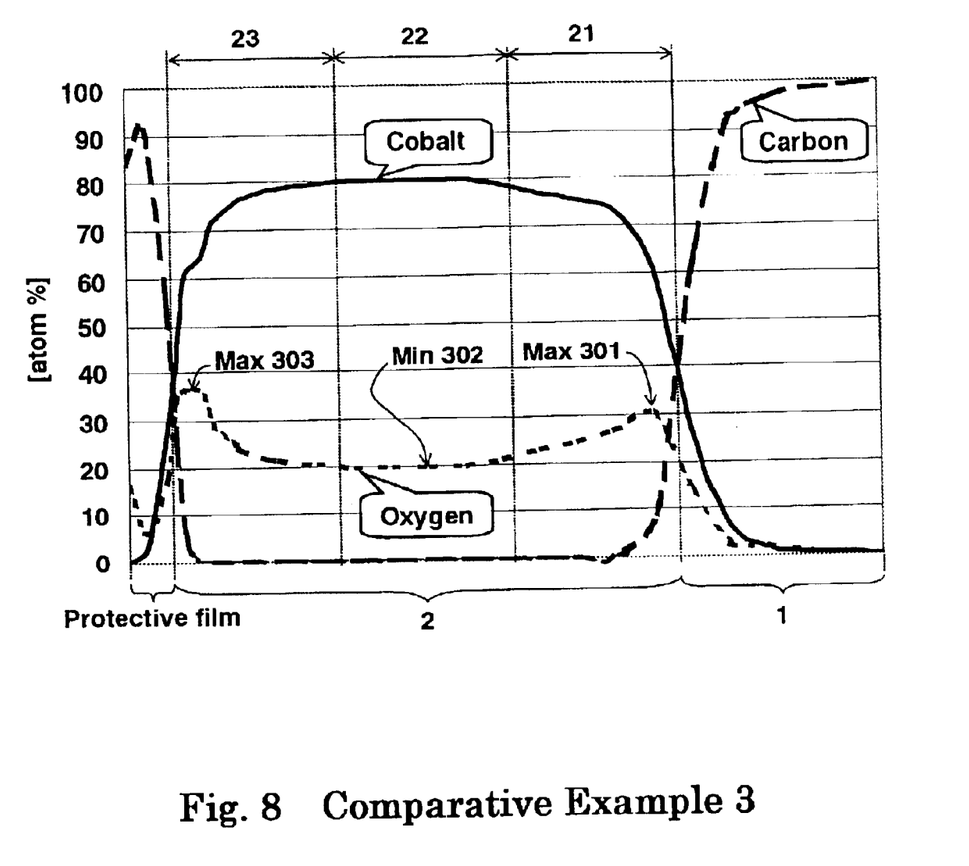
FIG. 8 is a graph of characteristics showing a result of analyzing elements in a magnetic recording medium according to the prior art (comparative example 3).

FIG. 8 is a graph of characteristics showing a result of analyzing elements in the magnetic recording medium according to the comparative example 3. Regions corresponding to the regions 21, 22 and 23 in FIG. 1 are also shown in FIG. 8 for easier understanding.

In FIG. 8, it is defined that a maximum value of oxygen concentration in the region 21 is "Max 301", a minimum value of oxygen concentration in the region 22 is "Min 302", and a maximum value of oxygen concentration in the region 23 is "Max 303". The values of "Max 301", "Min 302" and "Max 303" are compared with each other.

A magnetic recording medium shown in FIG. 8 has such a characteristic that oxygen concentration "Max 303" in the region 23 is the largest value, that is, "Min 302"<"Max 301"<"Max 303".

COMPARATIVE EXAMPLE 4

A magnetic recording medium according to a comparative example 4 is manufactured identically to the magnetic recording medium of the embodiment 1 except for settings of incident angle θ2 and an injection amount of oxygen gas through the oxygen gas injection spouts 9 and 10. In the comparative example 4, the incident angle θ2 is set to 45 degrees, and 100 sccm of oxygen gas is injected through the oxygen gas injection spout 9 and 2000 sccm of oxygen gas is injected through the oxygen gas injection spout 10.

COMPARATIVE EXAMPLE 5

A magnetic recording medium according to a comparative example 5 is manufactured identically to the magnetic recording medium of the embodiment 1 except for settings of incident angle θ2 and an injection amount of oxygen gas through the oxygen gas injection spout 10. In the comparative example 5, the incident angle θ2 is set to 30 degrees, and 2000 sccm of oxygen gas is injected through the oxygen gas injection spout 10.

COMPARATIVE EXAMPLE 6

A magnetic recording medium according to a comparative example 6 is manufactured identically to the magnetic recording medium of the embodiment 1 except for setting of incident angle θ2. In the comparative example 6, the incident angle θ2 is set to 60 degrees.

COMPARATIVE EXAMPLE 7

A magnetic recording medium according to a comparative example 7 is manufactured identically to the magnetic recording medium of the embodiment 1 except for settings of incident angles θ1 and θ2 and an injection amount of oxygen gas through the oxygen gas injection spouts 9 and 10. In the comparative example 7, the incident angles θ1 and θ2 is set to 50 degrees and 30 degrees respectively, and 1700 sccm of oxygen gas is injected through the oxygen gas injection spout 10, on the contrary, oxygen gas to be injected through the oxygen gas injection spout 9 is interrupted. Consequently, a first magnetic layer 31 shown in FIG. 6(b), which has a film thickness of 0.15 μm, is formed on a substrate 1. Then, the substrate 1 formed with the first magnetic layer 31 is rewound back to the supply roll 3 while the electron beam 13 is interrupted and a shutter (not shown) is closed so as for the substrate 1 not to be evaporated excessively.

Succeedingly, the incident angles θ1 and θ2 is changed to 90 degrees and 55 degrees respectively, and an injection amount of oxygen gas through the oxygen gas injection spout 10 is changed into 300 sccm and oxygen gas to be injected through the oxygen gas injection spout 9 is interrupted. Accordingly, a second magnetic layer 32 having a film thickness of 0.03 μm is formed on the first magnetic layer 31 as shown in FIG. 6(b).

Figure 9:
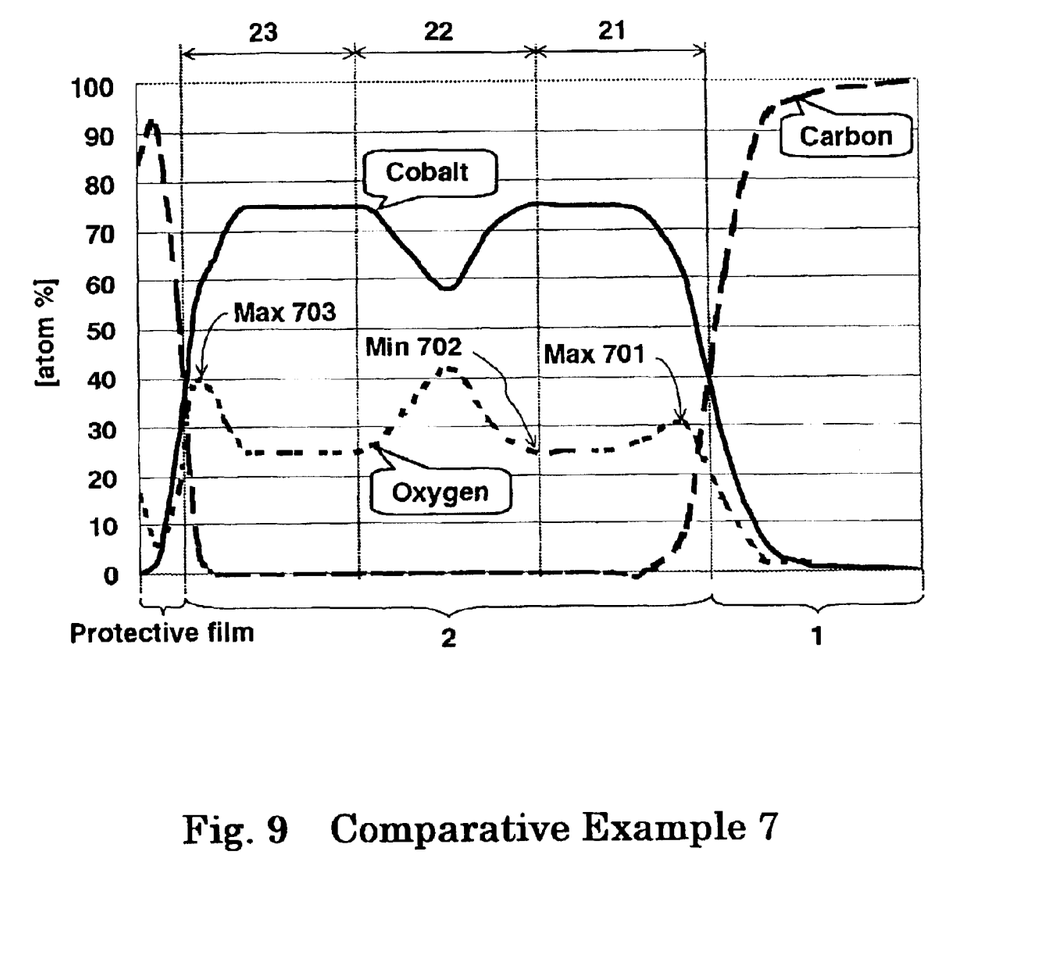
FIG. 9 is a graph of characteristics showing a result of analyzing elements in a magnetic recording medium according to the prior art (comparative example 7).

FIG. 9 is a graph of characteristics showing a result of analyzing elements in the magnetic recording medium according to the comparative example 7. Regions corresponding to the regions 21, 22 and 23 in FIG. 1 are also shown in FIG. 9 for easier understanding.

In FIG. 9, it is defined that a maximum value of oxygen concentration in the region 21 is "Max 701", a minimum value of oxygen concentration in the region 22 is "Min 702", and a maximum value of oxygen concentration in the region 23 is "Max 703". The values of "Max 701", "Min 702" and "Max 703" are compared with each other.

The magnetic recording medium shown in FIG. 9 is formed by a two-layer evaporation process, wherein oxygen concentration "Max 703" in the region 23 is larger than oxygen concentration "Max 701" in the region 21, in other words, "Min 702"<"Max 701"<"Max 703".

The magnetic recording mediums shown in FIG. 9 according to the comparative example 7 can not exhibit a high coercive force, a high reproduction output or a high C/N at all in a short wavelength recording range.

COMPARATIVE EXAMPLE 8

A magnetic recording medium according to a comparative example 8 is manufactured identically to the magnetic recording medium of the embodiment 1 except for settings of incident angles θ1 and θ2 and an injection amount of oxygen gas through the oxygen gas injection spouts 9 and 10. In the comparative example 8, the incident angles θ1 and θ2 is set to 20 degrees and −20 degrees respectively, and 300 sccm of oxygen gas is injected through the oxygen gas injection spout 10, on the contrary, oxygen gas to be injected through the oxygen gas injection spout 9 is interrupted. Consequently, a first magnetic layer 31 having a film thickness of 0.01 μm, is formed on a substrate 1. Then, the substrate 1 formed with the first magnetic layer 31 is rewound back to the supply roll 3 while the electron beam 13 is interrupted and a shutter (not shown) is closed so as for the substrate 1 not to be evaporated excessively.

Succeedingly, the incident angles θ1 and θ2 is changed to 90 degrees and 60 degrees respectively, and an injection amount of oxygen gas through the oxygen gas injection spout 10 is changed into 2000 sccm and oxygen gas to be injected through the oxygen gas injection spout 9 is interrupted. Accordingly, a second magnetic layer 32 having a film thickness of 0.17 μm is formed on the first magnetic layer 31 as shown in FIG. 6(b).

COMPARATIVE EXAMPLE 9

By using the manufacturing apparatus shown in FIG. 11, a magnetic recording medium according to a comparative example 9 is manufactured under the same processing conditions as the embodiment 1 except for an injection amount of oxygen gas to be injected through the oxygen gas injection spout 10.

In an evaporation process of the comparative example 9, the reflector 16 is heated to more than the melting point of cobalt (Co). A magnetic layer 2 having an oblique magnetic anisotropy is formed on a substrate 1 by a Co atom that is reflected by the reflector 16, and then the magnetic layer 2 is formed by a Co atom that flies from the crucible 11 directly while 2200 sccm of oxygen gas is injected through the oxygen gas injection spout 10.

Figure 10:
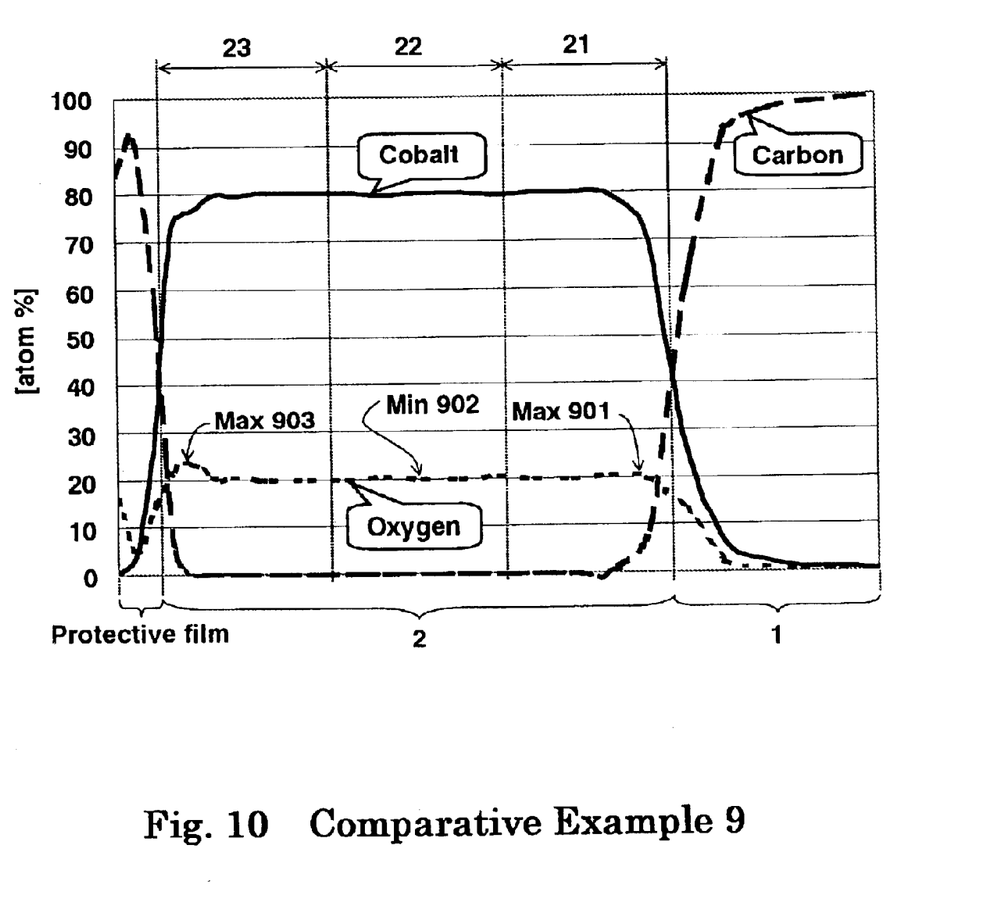
FIG. 10 is a graph of characteristics showing a result of analyzing elements in a magnetic recording medium according to the prior art (comparative example 9).

FIG. 10 is a graph of characteristics showing a result of analyzing elements in the magnetic recording medium according to the comparative example 9. Regions corresponding to the regions 21–23 in FIG. 1 are also shown in FIG. 10 for easier understanding.

In FIG. 10, it is defined that a maximum value of oxygen concentration in the region 21 is "Max 901", a minimum value of oxygen concentration in the region 22 is "Min 902", and a maximum value of oxygen concentration in the region 23 is "Max 903". The values of "Max 901", "Min 902" and "Max 903" are compared with each other.

The magnetic recording medium shown in FIG. 10 has such a characteristic that oxygen concentration "Max 903" in the region 23 is the largest value and "Min 902" is approximately equal to "Max 901, that is, "Min 902"="Max 901"<"Max 903".

The magnetic recording mediums shown in FIG. 10 according to the comparative example 9 can not exhibit a high coercive force, a high reproduction output or a high C/N at all in a short wavelength recording range.

Manufacturing conditions of each evaporation tape according to the embodiments 1 through 9 and comparative examples 1 through 9 are shown in Table 1 below.

TABLE 1

| | Incident angle | | Oxygen gas injection | |
|---|---|---|---|---|
| | θ 1 [degree] | θ 2 [degree] | Spout 9 [sccm] | Spout 10 [sccm] |
| Embodiment 1 | 90 | 40 | 50 | 2200 |
| Embodiment 2 | 80 | 55 | 50 | 1800 |
| Embodiment 3 | 80 | 55 | 50 | 2200 |
| Embodiment 4 | 90 | 30 | 80 | 2200 |
| Embodiment 5 | 90 | 40 | 30 | 2500 |
| Embodiment 6 | 90 | 40 | 50 | 2000 |
| Embodiment 7 | 90 | 35 | 0 | 2000 |
| Embodiment 8 | 90 | 35 | (50) | 2200 |
| Embodiment 9 | 90 | 35 | (80) | 2200 |
| Comparative Example 1 | 60 | 40 | 0 | 2100 |
| Comparative Example 2 | 90 | 40 | 50 | 3000 |
| Comparative Example 3 | 80 | 55 | 50 | 2000 |
| Comparative Example 4 | 90 | 45 | 100 | 2000 |
| Comparative Example 5 | 90 | 30 | 50 | 2000 |
| Comparative Example 6 | 90 | 60 | 50 | 2200 |
| Comparative Example 7 | 50 | 30 | 0 | 1700 |
| 2nd magnetic layer | 90 | 55 | 0 | 300 |
| Comparative Example 8 | 20 | −20 | 0 | 300 |
| 2nd magnetic layer | 90 | 60 | 0 | 2000 |
| Comparative Example 9 | 90 | 30 | 0 | 2200 |

With respect to each magnetic layer of each magnetic recording medium manufactured as mentioned above, first and third tilt angles θi and θe, which are an angle of start of growth and end of growth of a column, and a thickness δ until a second tilt angle θ exceeds 30 degrees is measured by a picture taken by a transmission electron microscope (TEM) showing a cross sectional view of each magnetic recording medium.

Further, by using a vibrating sample magnetometer (VSM), static magnetic characteristics are measured.

Furthermore, by using a digital video camera (model GR-DV1 manufactured by Victor Company of Japan, Ltd.) that is commonly available in the market, a reproduction output in a short wavelength recording range (21 MHz) and a C/N is measured. These electric characteristics are exhibited in relative value with respect to a reference tape (manufactured by Victor Company of Japan, Ltd.) that is referred to as "0 dB".

By using an ESCA (X-ray photo-electron spectroscopic analyzer), brand name "AXIS-HS", manufactured by Kratos Corp., analyzing elements of a magnetic recording medium in the depth direction totally is performed by analyzing elements at an x-ray output of 12 kV, 10 mA and sputter etching by argon gas repeatedly. An oxygen amount (oxygen concentration, atom %) with respect to a metal atom inside a magnetic layer of each magnetic recording medium is evaluated hereupon.

An evaluating method is as follows: measuring a maximum oxygen concentration "Max 1" in a first region 21, a minimum oxygen concentration "Min 2" in a second region 22 and a maximum oxygen concentration "Max 3" in a third region 23, and then ratios of them, that is, "Max 1"/"Min 2" and "Max 3"/"Min 2" is obtained.

A result of evaluation and the above-mentioned electric characteristics are shown in Table 2. In Table 2, a wording "None" in the thickness δ column represents that a magnetic layer is composed of two layers and crystal particles are not continuous.

A wording "Max 1" in Table 2 represents "Max 1" in FIG. 2, "Max 21" in FIG. 3, "Max 101" in FIG. 7, "Max 301" in FIG. 8, "Max 701" in FIG. 9, and "Max 901" in FIG. 10 respectively.

Further, a wording "Min 2" in Table 2 represents "Min 2" in FIG. 2, "Min 22" in FIG. 3, "Max 102" in FIG. 7, "Min 302" in FIG. 8, "Min 702" in FIG. 9, and "Min 902" in FIG. 10 respectively.

Furthermore, a wording "Max 3" in Table 2 represents "Max 3" in FIG. 2, "Max 23" in FIG. 3, "Max 103" in FIG. 7, "Max 303" in FIG. 8, "Max 703" in FIG. 9, and "Max 903" in FIG. 10 respectively.

As it is apparent from Table 2, in the magnetic recording mediums (Embodiments 1 through 9) according to the present invention, when the magnetic layer 2 formed on the substrate 1 is divided into three regions equally such as the first region 21, the second region 22 and the third region 23, which contain oxygen respectively, the magnetic layer 2 is constituted such that the maximum oxygen concentration "Max 1" in the first region is the largest and the minimum oxygen concentration "Min 2" in the second region 22 is smaller than "Max 1", that is, "Min 2"<"Max 1". In addition, the maximum oxygen concentration "Max 3" in the third region is larger than "Min 2" and smaller than "Max 1", that is, "Min 2"≦"Max 3"≦"Max 1".

Further, as it is apparent from the columns of "Reproduction Output" and "C/N" in Table 2, the magnetic recording mediums according to the present invention can obtain a high reproduction output and a high C/N in comparison with the conventional magnetic recording mediums (Comparative Examples 1 through 9).

TABLE 2

| | Oxygen Concentration [atom %] | | | | | | Static Magnetic Characteristic | | | Electric Characteristics (at 21 MHz) | |
|---|---|---|---|---|---|---|---|---|---|---|---|
| | Region 23 Max 3 | Max 3/ Min 2 | Region 22 Min 2 | Region 21 Max 1 | Max 1/ Min 2 | Characteristic Drawing | δ [nm] | θ i [°] | θ 3 [°] | Coercive force [kA/m] | Reproduction Output [dB] | C/N [db] |
| Embodiment 1 | 33 | 1.10 | 30 | 36 | 1.20 | FIG. 2 | 8 | 10 | 35 | 123 | 2.0 | 1.0 |
| Embodiment 2 | 26 | 1.00 | 26 | 35 | 1.35 | FIG. 3 | 12 | 0 | 50 | 125 | 2.5 | 1.5 |
| Embodiment 3 | 39 | 1.39 | 28 | 39 | 1.39 | FIG. 2 | 10 | 5 | 50 | 129 | 1.0 | 1.0 |
| Embodiment 4 | 26 | 1.30 | 20 | 31 | 1.55 | FIG. 2 | 8 | 5 | 20 | 122 | 1.5 | 0.5 |
| Embodiment 5 | 39 | 1.18 | 33 | 39 | 1.18 | FIG. 2 | 8 | 15 | 30 | 135 | 1.5 | 0.5 |
| Embodiment 6 | 29 | 1.00 | 29 | 38 | 1.31 | FIG. 3 | 6 | 15 | 30 | 120 | 2.0 | 1.5 |
| Embodiment 7 | 22 | 1.22 | 18 | 22 | 1.22 | FIG. 2 | 3 | 30 | 30 | 110 | 0.5 | 0.5 |
| Embodiment 8 | 34 | 1.21 | 28 | 34 | 1.21 | FIG. 2 | 12 | 5 | 30 | 125 | 1.5 | 2.0 |
| Embodiment 9 | 34 | 1.13 | 30 | 39 | 1.30 | FIG. 2 | 14 | 0 | 30 | 130 | 2.0 | 2.0 |
| Comp. Ex. 1 | 22 | 1.00 | 22 | 22 | 1.00 | FIG. 7 | 2 | 35 | 30 | 110 | 0.0 | −2.0 |

TABLE 2-continued

| | Oxygen Concentration [atom %] | | | | | | Static Magnetic Characteristic | | | Electric Characteristics (at 21 MHz) Reproduction | |
|---|---|---|---|---|---|---|---|---|---|---|---|
| | Region 23 Max 3 | Max 3/ Min 2 | Region 22 Min 2 | Region 21 Max 1 | Max 1/ Min 2 | Characteristic Drawing | δ [nm] | θ i [°] | θ 3 [°] | Coercive force [kA/m] | Output [dB] | C/N [db] |
| Comp. Ex. 2 | 45 | 1.28 | 35 | 40 | 1.14 | FIG. 8 | 6 | 8 | 35 | 135 | −2.0 | −0.5 |
| Comp. Ex. 3 | 37 | 1.85 | 20 | 30 | 1.50 | FIG. 8 | 8 | 10 | 50 | 120 | −1.0 | 0.0 |
| Comp. Ex. 4 | 42 | 1.50 | 28 | 36 | 1.29 | FIG. 8 | 16 | 0 | 35 | 120 | −1.5 | −0.5 |
| Comp. Ex. 5 | 20 | 1.33 | 15 | 18 | 1.20 | FIG. 8 | 10 | 10 | 18 | 105 | −1.5 | −1.0 |
| Comp. Ex. 6 | 40 | 1.60 | 25 | 30 | 1.20 | FIG. 8 | 10 | 10 | 55 | 120 | −2.0 | −0.5 |
| Comp. Ex. 7 | 40 | 1.60 | 25 | 30 | 1.20 | FIG. 9 | None | 30 | 55 | 110 | 0.0 | 0.0 |
| Comp. Ex. 8 | 25 | 1.25 | 20 | 20 | 1.00 | FIG. 9 | None | 0 | 45 | 120 | 0.0 | −0.5 |
| Comp. Ex. 9 | 24 | 1.20 | 20 | 20 | 1.00 | FIG. 10 | 6 | 30 | 30 | 115 | −0.5 | −1.0 |

Note:
"Comp. Ex." represents "Comparative Example".

A coercive force of magnetic layer is apt to depend on oxygen concentration in a second region. Controlling an oxygen injection amount into a second region in order to optimize oxygen concentration in the second region is resulted in obtaining magnetic recording mediums according to the embodiment of the present invention.

According to the present invention, by adjusting the relation among "Max 1", "Min 2" and "Max 3" as mentioned above, oxygen concentration in the second region can be increased within an optimum range. Consequently, a high reproduction output, as high as a problem of reducing reproduction output caused by spacing loss does not become an actual problem, can be obtained.

As mentioned above, it is desirable for oxygen concentration of a magnetic layer according to the embodiments of the present invention that oxygen concentration in a second region is more than 18% and less than 33% in addition to having the configuration of "Min 2"<"Max 1" and "Min 2"≦"Max 3"≦"Max 1".

Further, with paying attention to a ratio of oxygen concentration between the second region 22 and the third region 23, as far as the ratio "Max 3"/"Min 2" is always less than 1.4 and the ratio "Max 1"/"Min 2" of oxygen concentration between the first region 21 and the second region 22 is more than 1.1, it is resulted in reducing noise and improving a C/N. A higher reproduction output and a higher C/N can be obtained as a result.

As detailed above, in a magnetic recording medium according to the present invention, a magnetic layer is divided into three regions equally in the thickness direction, wherein the three regions are referred to as first, second and third regions from a substrate side to a surface side of the magnetic layer respectively. With defining that a maximum value of oxygen concentration in the first region is "Max 1", a minimum value of oxygen concentration in the second region is "Min 2", and a maximum value of oxygen concentration in the third region is "Max 3" respectively, "Max 1", "Min 2" and "Max 3" is constituted so as to satisfy following equations.

"Min 2"<"Max 1"

and

"Min 2"≦"Max 3"≦"Max 1".

Accordingly, a magnetic recording medium according to the present invention can obtain a high coercive force, a high reproduction output in a short wavelength range and a high C/N in comparison with the conventional magnetic recording mediums.

It will be apparent to those skilled in the art that various modifications and variations could be made in the magnetic recording medium and the manufacturing apparatus thereof in the present invention without departing from the scope or spirit of the invention.

What is claimed is:

1. A magnetic recording medium comprising:

a substrate; and a single magnetic layer containing mixture of cobalt (Co) and cobalt oxide (CoO) as a ferromagnetic metal, the magnetic recording medium is characterized in that the magnetic layer is divided into three regions, which are a first region, a second region and a third region respectively, wherein a thickness of each region in the direction normal to the plane of the substrate is equal, and with defining such that a maximum value of oxygen concentration in the first region is "Max 1", a minimum value of oxygen concentration in the second region is "Min 2", and a maximum value in the third region is "Max 3", the values "Max 1", "Min 2" and "Max 3" satisfy following equations:

"Min 2"<"Max 1"

and

"Min 2"≦"Max 3"≦"Max 1", and further characterized in that oxygen concentration prescribed by O/(Co+CoO) and oxygen concentration of Min 2 is more than 18% and less than 33% respectively.

2. The magnetic recording medium in accordance with claim 1, wherein a tilt angle of a column that constitutes the magnetic layer and is composed of a crystalline particle of ferromagnetic metal and grows on the substrate from the start of growth to a range of 3 to 14 nm thick is within a range of between 0 degree and 30 degrees with respect to the normal line of the substrate and wherein the tilt angle of the column beyond the range of 3 to 14 nm thick exceeds 30 degrees.

3. The magnetic recording medium in accordance with claim 1, wherein oxygen concentration of "Max 3" is less than 1.4 times oxygen concentration of "Min 2".

* * * * *